UNITED STATES PATENT OFFICE.

ARTHUR ASHWORTH AND JOSHUA BÜRGER, OF BURY, ENGLAND.

PROCESS OF MAKING BLACK SULFUR DYE.

SPECIFICATION forming part of Letters Patent No. 653,277, dated July 10, 1900.

Application filed May 8, 1899. Serial No. 716,068. (Specimens.)

*To all whom it may concern:*

Be it known that we, ARTHUR ASHWORTH and JOSHUA BÜRGER, of Bury, England, have invented a new and useful Improvement in the Production of Coloring-Matters, of which the following is a specification.

We have found that the compounds obtained by Liebermann's reaction—that is, by the action of nitrosophenols on phenols in the presence of sulfuric acid—yield under certain treatment valuable coloring-matters capable of dyeing vegetable fibers black and brown shades from an alkaline bath.

As an example how to produce a black coloring-matter we proceed in the following way: Ten pounds of para nitrosophenol and forty pounds of phenol are mixed with twenty pounds concentrated sulfuric acid. After the reaction is over one hundred pounds of caustic-soda solution of 80° Twaddell are added and then thirty pounds of finely-ground sulfur mixed with it. The whole mass is heated for several hours to 180° centigrade until the reaction is completed. The color thus produced dyes from an alkaline bath on vegetable fibers greenish blacks, which on oxidation with bichromate of soda and sulfuric acid or similar oxidizing agents are converted into deeper blacks of great fastness. The alkaline salts of the color are soluble in water, insoluble in ether, slightly soluble in hot alcohol, and the free color—that is, the color precipitated by mineral acids from its alkaline salts—is insoluble in water. The proportions and temperatures above given may be varied.

As an example how to produce a brown coloring-matter we proceed in the following way: Seventeen and one-half pounds of beta nitrosonaphtol and forty pounds of phenol are mixed with twenty pounds of concentrated sulfuric acid. After the reaction is over add one hundred pounds of caustic-soda solution of 80° Twaddell and then thirty pounds of sulfur. The whole mass is heated for several hours to 180° centigrade until the reaction is completed. The color thus produced dyes from an alkaline bath on vegetable fibers brownish shades, which on oxidation with bichromate of soda and sulfuric acid or similar oxidizing agents are converted into deeper browns of great fastness. The alkaline salts of the color are soluble in water, insoluble in ether, slightly soluble in hot alcohol, and the free color—that is, the color precipitated by mineral acids from its alkaline salts—is insoluble in water. The proportions and temperatures above given may be varied.

The new coloring-matters obtained by the processes above described form the subject-matter of an application filed by us the 7th day of November, 1899, Serial No. 736,098.

What we claim as new is—

The production of coloring-matters, dyeing cotton black, or brown from an alkaline bath which consists in treating the bodies obtained by the action of nitrosophenols on phenols, in sulfuric-acid solution, with alkali and sulfur at a temperature of about 180° centigrade, substantially as described.

In testimony whereof we have signed our names to this specification in the presence of two subscribing witnesses.

ARTHUR ASHWORTH.
JOSHUA BÜRGER.

Witnesses:
ERNALD S. MOSELEY,
JOHN W. THOMAS.